T12) United States Patent
Tsunehara et al.

(10) Patent No.: US 7,236,879 B2
(45) Date of Patent: Jun. 26, 2007

(54) METHOD FOR CALCULATING THE POSITION OF A MOBILE TERMINAL, POSITIONING SYSTEM, AND POSITION CALCULATION APPARATUS

(75) Inventors: Katsuhiko Tsunehara, Hachioji (JP); Kenzaburo Fujishima, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 655 days.

(21) Appl. No.: 10/756,404

(22) Filed: Jan. 14, 2004

(65) Prior Publication Data
US 2004/0172190 A1 Sep. 2, 2004

(30) Foreign Application Priority Data
Feb. 27, 2003 (JP) ............................. 2003-050919

(51) Int. Cl.
*G01C 21/00* (2006.01)
(52) U.S. Cl. ............... 701/207; 455/456.1; 340/539.13
(58) Field of Classification Search ................ 701/202, 701/207, 213; 455/456.1, 456.2, 456.5, 456.6, 455/457; 340/539.11, 539.13
See application file for complete search history.

(56) References Cited

U.S. PATENT DOCUMENTS

| | | | | |
|---|---|---|---|---|
| 6,097,959 | A * | 8/2000 | Yost et al. | 455/456.2 |
| 6,201,973 | B1 * | 3/2001 | Kowaguchi | 455/456.6 |
| 6,246,861 | B1 * | 6/2001 | Messier et al. | 455/12.1 |
| 6,973,316 | B1 * | 12/2005 | Hayakawa | 455/456.1 |
| 7,031,722 | B2 * | 4/2006 | Naghian | 455/456.1 |
| 7,089,019 | B2 * | 8/2006 | Ormson | 455/456.1 |
| 7,139,584 | B2 * | 11/2006 | Lin | 455/456.5 |
| 2001/0034223 | A1 | 10/2001 | Rieser et al. | |

FOREIGN PATENT DOCUMENTS

| | | |
|---|---|---|
| EP | 1 233 280 A2 | 1/2002 |
| EP | 1 233 280 A3 | 1/2002 |
| JP | 7-181242 | 12/1993 |
| WO | WO 00/26687 | 9/1999 |

OTHER PUBLICATIONS

U.S. Appl. No. 10/463,608, filed Jun. 18, 2003, Ogino et al.
European Search Report dated May 18, 2005.

* cited by examiner

*Primary Examiner*—Gary Chin
(74) *Attorney, Agent, or Firm*—Reed Smith LLP; Stanley P. Fisher, Esq.; Juan Carlos A. Marquez, Esq.

(57) ABSTRACT

In the present invention, even if a mobile terminal is close to a base station, the position of the mobile terminal is measured accurately. The disclosed method for calculating the position of a mobile terminal comprises: measuring the differences between the propagation distances of the signals on the channels between a plurality of base stations and the mobile terminal; determining if the mobile terminal is close to a base station; calculating the position of the mobile terminal by a common formula if it is determined that the mobile terminal is not in close proximity to any of the base stations; calculating the position of the mobile terminal in close proximity to a base station if it is determined that the mobile terminal is in close proximity to one of the base stations; and outputting the position of the mobile terminal calculated through either of the routines for calculating the mobile terminal position.

17 Claims, 11 Drawing Sheets

FIG. 5

FROM STEP 200
↓
EQUATE MT POSITION WITH THE POSITION OF BS W  — 400
↓
GO TO STEP 112

MT : MOBILE TERMINAL
BS : BASE STATION

FIG. 6

FROM STEP 200
↓
EVALUATE THE EQUATION (MATHEMATICAL EXPRESSION 1) BY TRILATERATION TO OBTAIN ALL REAL ROOTS — 410
↓
EVALUATE AN AVERAGE OF ALL REAL ROOTS AS MT POSITION — 411
↓
GO TO STEP 112

MT : MOBILE TERMINAL

MT : MOBILE TERMINAL
BS : BASE STATION

MT : MOBILE TERMINAL
BS : BASE STATION

MT : MOBILE TERMINAL

METHOD FOR CALCULATING THE POSITION OF A MOBILE TERMINAL, POSITIONING SYSTEM, AND POSITION CALCULATION APPARATUS

PRIORITY CLAIM

This application claims priority under 35 USC §119 to Japanese patent application P2003-050919 filed Feb. 27, 2003 the entire disclosure of which is hereby incorporated by reference herein.

BACKGROUND OF THE INVENTION

1. Field of the Invention

The present invention relates to a mobile terminal position calculation method, positioning system, and position calculation apparatus for measuring the position of a mobile terminal, using radio signals.

2. Description of Related Art

In a cellular telephony system, a method of calculating the present position of a mobile terminal, using signals transmitted from base stations to the mobile terminal has been proposed. For example, such a method is described in Patent Document Cited 1, JP-A No. 181242/1995.

In the method of measuring the present position of a mobile terminal, described in Patent Document Cited 1 (FIGS. 14 and 15), first, in an action of measuring differences between propagation distances 110, measurements are taken of differences between propagation distances of signals from the mobile terminal to multiple base stations. Concretely, a mobile-terminal 104 receives signals transmitted from cellular telephony base stations 101, 102, and 103. At this time, the mobile terminal 104 records the times at which the respective signals from the base stations have arrived at the mobile terminal. By calculating differences between the signal arrival times, time differences of signal propagation on the channels from the base stations to the mobile terminal $T_1-T_2$ and $T_3-T_2$ are calculated. Finally, the thus calculated propagation time differences are multiplied by light velocity and, thereby, differences between the propagation distances of the signals from the base stations to the mobile terminal $D_1-D_2=c(T_1-T_2)$ and $D_3-D_2=c(T_3-T_2)$ are calculated.

Next, in an action of calculating MT position by trilateration 111, the position of the mobile terminal is calculated, using the principle of trilateration. Concretely, a relation (equation) given in mathematical expression 1 between propagation distance differences $D_1-D_2$ and $D_3-D_2$ measured in the action of measuring differences between propagation distances 110 and the position of the mobile terminal (X, Y) is solved to obtain unknown values (X, Y) of the mobile terminal position. In mathematical expression 1, c represents light velocity and $D_N$ (N=1, 2, 3) represents distance from the mobile terminal to base station N.

$c(T_1-T_2)=D_1-D_2$ $c(T_3-T_2)=D_3-D_2$ $D_N=\{(X-X_N)^2+(Y-Y_N)^2\}^{1/2}$ (N=1, 2, 3)   [Mathematical expression 1]

Finally, in an action of outputting MT position 112, the mobile terminal position obtained by solving the equation of mathematical expression 1 is output as the result of position calculation.

Also, a method of calculating the present position of a mobile terminal, using signals transmitted from the mobile terminal and received by a plurality of base stations has been offered; for example, such a method using signals transmitted on a wireless LAN, disclosed in JP-B No. 260772/2002 corresponding to U.S. application Ser. No. 10/463,608, a prior application made by one of the present inventors.

In the foregoing method of prior art, as shown in FIGS. 14 and 15, firstly, the position of a mobile terminal cannot be obtained according to conditions of measurement. For example, if $|c(T_1-T_2)|>D_{12}$ (where $D_{12}$ is distance between base station 1 and base station 2) due to the influence of measurement errors of propagation time differences, the condition of forming a triangle among the mobile terminal, base station 1, and base station 2 is not satisfied and the equation of mathematical expression 1 does not give a real root. Especially, when the mobile terminal is in close proximity to a base station, the above condition $|c(T_1-T_2)|>D_{12}$ is met by even a small degree of measurement errors and, therefore, the probability that the equation of mathematical expression 1 does not give a real root increases. In such cases, the position of the mobile terminal cannot be obtained by the method of prior art.

In general, the equation of mathematical expression 1 gives a plurality of position solutions. If the mobile terminal is in the proximity of a base station, there is the plurality of position solutions to the equation of mathematical expression 1 near the base station. Consequently, it is impossible to select a proper solution from the plurality of position solutions of the mobile terminal. Thus, in this case also, the position of the mobile terminal cannot be obtained.

As mentioned above, when the mobile terminal is positioned in the proximity of a base station, its position cannot be obtained, and an area where a position information service is offered is narrowed and convenience is lowered.

Secondly, a rise in the cost of the position information service may be induced. Because the equation of mathematical expression 1 is difficult to solve analytically, a method of obtaining a solution by repetitive arithmetic operations is generally taken. This method involves large amounts of arithmetic operations and it may be necessary to repeat arithmetic operations hundreds of thousand of times according to conditions, and a high load is applied to an arithmetic unit which executes position calculation. When making use of applications which tolerate position measurement errors within a few hundred meters, for example, weather forecasts and information services about road traffic congestion and the like, the arithmetic unit must have performance enough to cope with excessive loads and this causes a rise in the cost of mobile terminals and the cost of the position information service.

SUMMARY OF THE INVENTION

In the present invention, in order to solve the foregoing first problem, the method for calculating the position of a mobile terminal includes an action to determine whether the mobile terminal is in close vicinity to a base station. If it is determined that the mobile terminal is in close vicinity to a base station, the position of the mobile terminal is calculated by a position calculation method fit for the case where the mobile terminal is in close vicinity to a base station.

In order to solve the foregoing second problem, the present invention adopts a parameter for controlling the amount of arithmetic operation required for position calculation. The amount of arithmetic operation for position calculation is controlled by setting the parameter at a value appropriate for required accuracy of position measurement.

Specifically, the present invention provides a method for calculating the position of a mobile terminal, using differences between propagation distances of radio signals being transmitted/received on channels between base stations and a mobile terminal, the method comprising: measuring the differences between the propagation distances of the signals on the channels between a plurality of base stations and the mobile terminal; determining if the mobile terminal is close to a base station, which determines whether the mobile terminal is in close proximity to any of the plurality of base stations; calculating the position of the mobile terminal by a common formula if it is determined that the mobile terminal is not in close proximity to any of the base stations; calculating the position of the mobile terminal in close proximity to a base station if it is determined that the mobile terminal is in close proximity to one of the base stations; and outputting the position of the mobile terminal calculated through calculating the mobile terminal position in close proximity to a base station or calculating the mobile terminal position by a common formula. Thus, even if the mobile terminal is in close proximity to a base station, the position of the mobile terminal can be measured with accuracy and stability. Consequently, the area where the position information service can be offered would be extended and enhancing the convenience would be achievable.

BRIEF DESCRIPTION OF THE DRAWINGS

FIG. 5 is a flowchart of a first example taken while calculating the mobile terminal position in close proximity to a base station, according to the preferred embodiment of the present invention;

FIG. 6 is a flowchart of another example of sub-actions taken while calculating the mobile terminal position in close proximity to a base station, according to the preferred embodiment of the present invention;

DETAILED DESCRIPTION OF THE PREFERRED EMBODIMENTS

Preferred embodiments of the present invention and the best mode will be described hereinafter with reference to the accompanying drawings.

Figure 1:
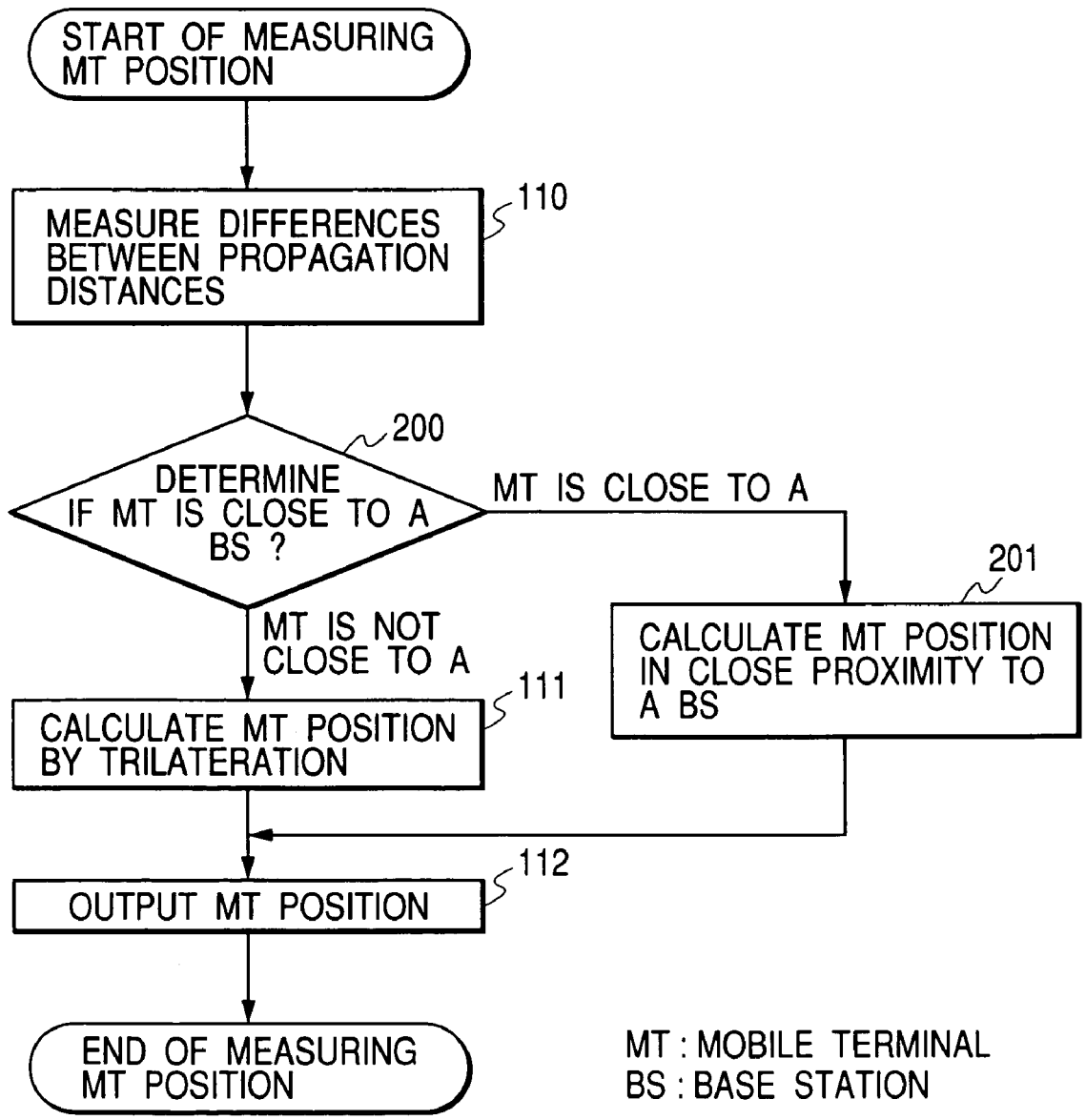
FIG. 1 is a flowchart of the method of calculating the position of a mobile terminal, according to a preferred embodiment of the present invention.

FIG. 1 is a flowchart of the method of calculating the position of a mobile terminal, according to a preferred embodiment of the present invention.

Figure 15:
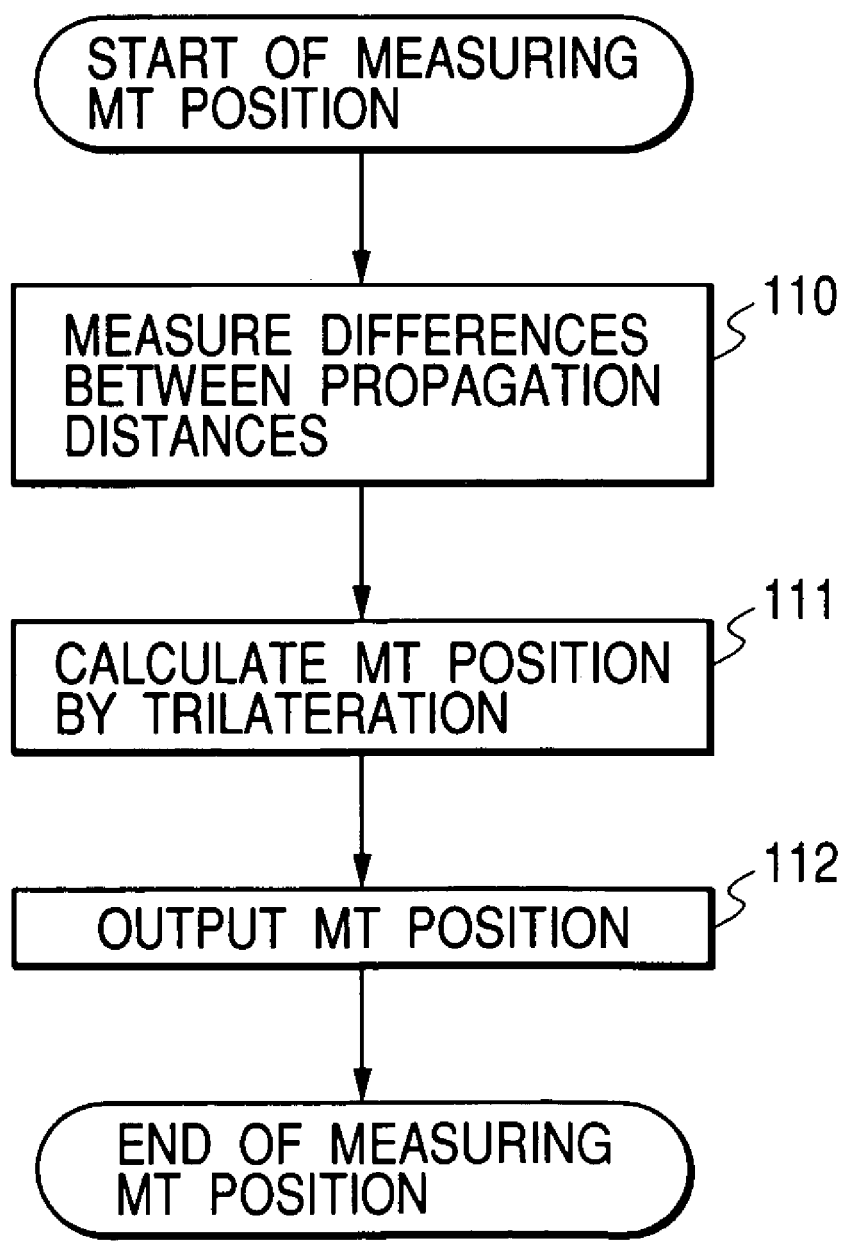
FIG. 15 is a flowchart of the prior art method of calculating the position of a mobile terminal.

The flowchart of FIG. 1 includes carrying out the same functions as done in the corresponding flowchart of FIG. 15 which explains the prior art method of calculating the position of a mobile terminal. These actions are assigned the same reference numbers and their detailed explanation is not repeated.

First, through measuring differences between propagation differences, measurements are taken of differences between propagation distances of signals from the mobile terminal to multiple base stations (110). The measurements of such differences between propagation distances can be taken, based on the calculation of propagation time differences from the measured times at which the mobile terminal received the signals transmitted on individual channels from the base stations in the same manner as applied in the prior art method. The same measurements may be taken, based on the calculation of propagation time differences from the measured times at which the base stations received signals transmitted from the mobile terminal, reversely.

Moreover, the measurements of such differences between propagation distances can be taken, based on measurements of received power of the signals transmitted from the base stations at the mobile terminal. For example, the mobile terminal measures received power PN (N=1, 2, 3) of the signals from the base stations. In general, the received power of a signal transmitted from a base station to the mobile terminal is in inverse proportion to the distance from the base station to the mobile terminal, which is represented by the following relation: $PN = AN \times DN^{-\alpha}$ where, PN is signal received power obtained by measurement, AN is a known coefficient which is determined by the signal transmitting power at the base station, antenna gain, etc., and $\alpha$ is a known propagation constant which is determined from an assumed propagation channel model. The above equation is modified to: $DN = (PN/AN)^{-1/\alpha}$ Using this modified equation, distance from the mobile terminal to the base station that transmitted signal is obtained from the measurement of the received power of the signal at the mobile terminal for each base station. By calculating differences between the DNs thus obtained for the base stations, the measured differences of the propagation distances on each channel (that is, the value per base station corresponding to the left side member of the foregoing equation of mathematical expression 1) can be obtained. Reversely, for signals transmitted from the mobile terminal to the base stations, based on the received power measurements of the signals at the base stations, the same algorithm as above may be executed.

Next, determining if the mobile terminal is close to a base station is executed, which determines whether the mobile terminal is in close proximity to a base station (200). If it is determined that the mobile terminal is not in close proximity to a base station, the position of the mobile terminal is calculated by a common formula using the principle of trilateration, based on the differences between propagation distances obtained in action 110, action (111).

Otherwise, if it is determined that the mobile terminal is in close proximity to a base station, the position of the mobile terminal is calculated by a method fit for the case where the mobile terminal is in close proximity to a base station, which will be described later (201). Then, the mobile terminal position obtained by calculating its position by a common formula using trilateration (111) or calculating its position in close proximity to a base station (201) is converted into a predetermined format in accordance with an application program that uses output data and the thus formatted result of the calculation of the mobile terminal position is output (112), and, then, the procedure of measuring the mobile terminal position terminates.

Next, determining whether the mobile terminal is close to a base station (200 in FIG. 1) will be described.

Figure 2:
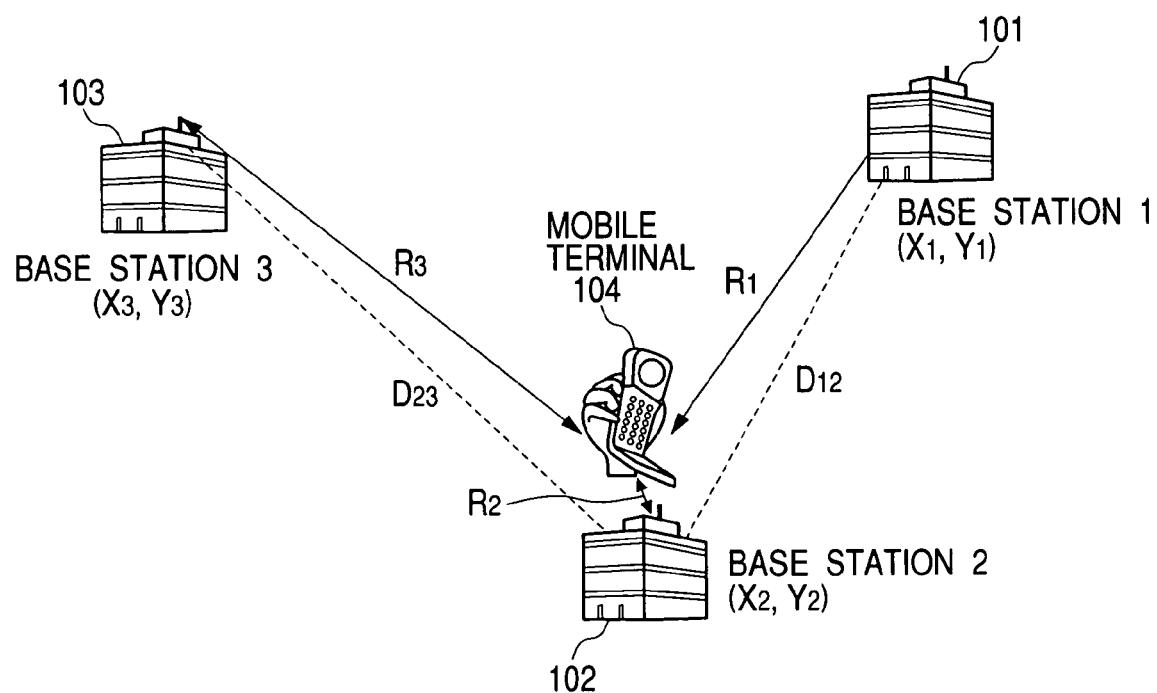
FIG. 2 is a radio communications system configuration diagram, according to the preferred embodiment of the present invention.

FIG. 2 is a radio communications system configuration diagram according to the preferred embodiment of the present invention.

If the mobile terminal is in close proximity to base station 1, the difference between the propagation distance on the channel between base station 2 and the mobile terminal and the propagation distance on the channel between the base station 1 and the mobile terminal is approximately equal to the distance between the base station 1 and the base station 2. For example, as is shown in FIG. 2, if the mobile terminal is in close proximity to base station 2, propagation distance $R_2$ on the channel between the base station 2 and the mobile terminal decreases and propagation distance $R_1$ between the base station 1 and the mobile terminal is approximately equal to distance $D_{12}$ between the base station 2 and the base station 1. Thus, difference $(R_1-R_2)$ between the propagation distances on the channels between both the base stations and the terminal is approximately equal to the distance $D_{12}$ between the base station 1 and the base station 2. Taking advantage of this geometrical property of radio propagation, among N base stations (base station 1 to base station N), if a base station W which meets a constraint of mathematical expression 2 given below exists, it is determined that the mobile terminal is in close proximity to the base station W.

$$D_{VW}-B \leq R_V-R_W \leq D_{VW}+B$$

(V=1, 2, . . . N, except W)  [Mathematical expression 2]

In mathematical expression 2, $D_{VW}$ represents distance between base station V and base station W. $R_V-R_W$ represents difference between the signal propagation distance on the channel between the base station V and the mobile terminal and the signal propagation distance on the channel between the base station W and the mobile terminal, measured while measuring distances between propagation distances 110. B is a parameter which is used in determining if the mobile terminal is close to a base station; a greater value should be assigned to the parameter B if a rather wide range around a base station is regarded as the proximity range of the base station and a smaller value should be assigned to the parameter B if a rather narrow range around a base station is regarded as the proximity range of the base station. For example, in the case of applications such as weather forecasts and information on road traffic congestion which allow for a low accuracy of position measurement within a few hundred meters, the value of the parameter B should be set at a few hundred meters equivalent to the required accuracy of position measurement. In the case of applications such as navigation which require a high accuracy of position measurement within about ten meters, the value of parameter B should be set at about ten meters equivalent to the required accuracy of position measurement.

Specifically, the constraint of mathematical expression 2 is used to determine whether difference $R_V-R_W$ between the propagation distances on the channels from two base stations falls within a predetermined tolerance of error B for the distance $D_{VW}$ between both the base stations.

Figure 3:
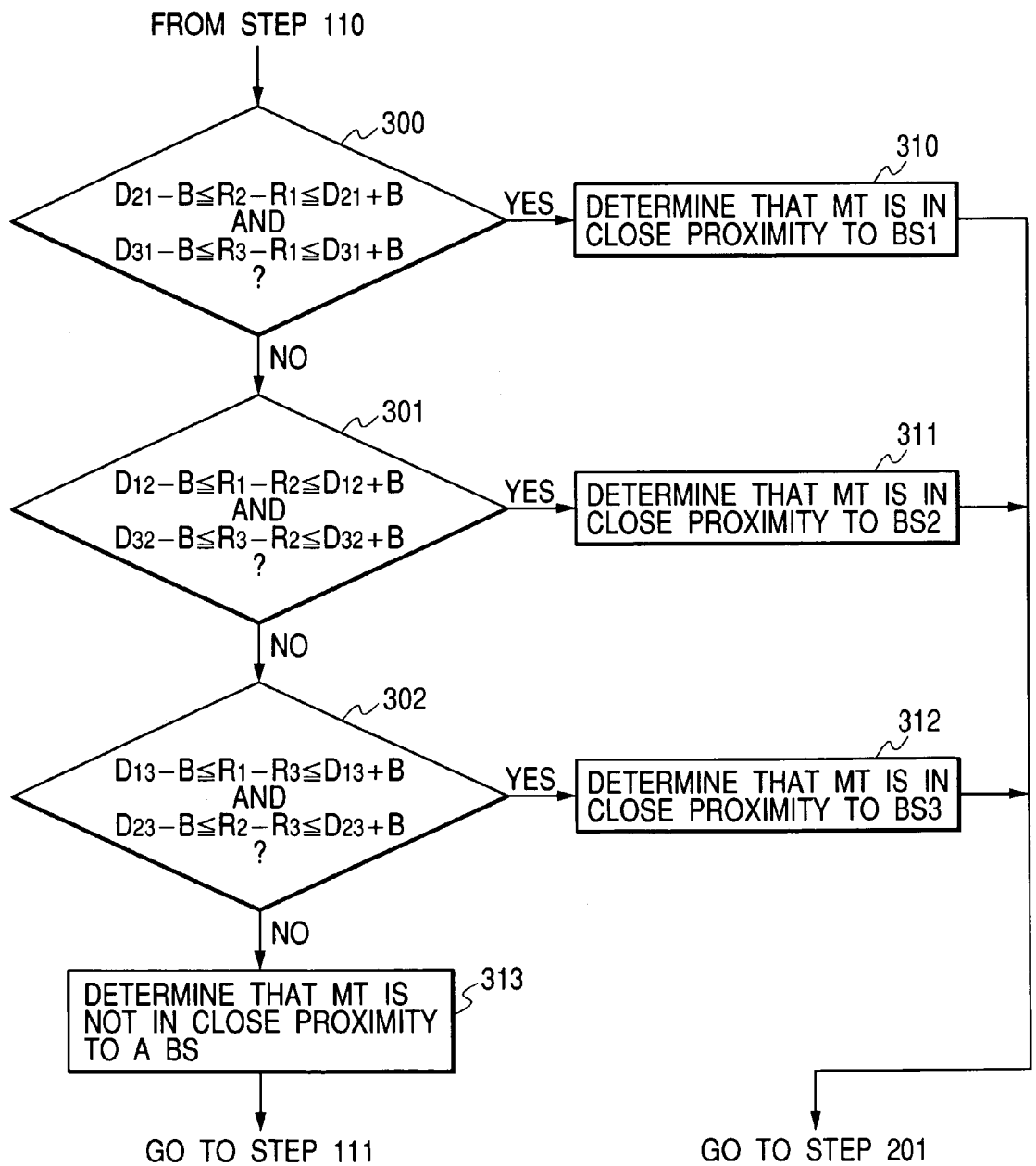
FIG. 3 is a flowchart of a first example of sub-actions taken within the determining if the mobile terminal is close to a base station, according to the preferred embodiment of the present invention.

FIG. 3 is a flowchart of a first example of sub-actions taken while determining if the mobile terminal is close to a base station (200 in FIG. 1) in a scenario where the mobile terminal can receive radio channels from three base stations as shown in FIG. 2.

First, it is determined whether the mobile terminal is in close proximity to base station 1, using the constraint of mathematical expression 2 (300). For the relation between base station 1 and base station 2 and the relation between base station 1 and base station 3, it is determined whether the constraint of mathematical expression 2 is fulfilled. As a result, if it is determined for both relations that difference between the propagation distances on the channels from the base stations to the mobile terminal falls within a predetermined tolerance of error (±B) of the physical distance between both the base stations, it is determined that the mobile terminal is in close proximity to base station 1 (310) and the procedure proceeds calculating the mobile terminal position in close proximity to a base station (201 in FIG. 1).

Similarly, by determining whether the constraint of mathematical expression 2 is fulfilled for the relation between base station 1 and base station 2 and the relation between base station 2 and base station 3, it is determined whether the mobile terminal is in close proximity to base station 2 (301). As a result, if it is determined for both relations that difference between the propagation distances on the channels from the base stations to the mobile terminal falls within a predetermined tolerance of error (±B) of the physical distance between both the base stations, it is determined that the mobile terminal is in close proximity to base station 2 (311) and the procedure proceeds to calculating the mobile terminal position in close proximity to a base station (201 in FIG. 1)

Similarly, by determining whether the constraint of mathematical expression 2 is fulfilled for the relation between base station 1 and base station 3 and the relation between base station 2 and base station 3, it is determined whether the mobile terminal is in close proximity to base station 3 (302). As a result, if it is determined for both relations that difference between the propagation distances on the channels from the base stations to the mobile terminal falls within a predetermined tolerance of error (±B) of the physical distance between both the base stations, it is determined that the mobile terminal is in close proximity to base station 3 (312) and the procedure proceeds to calculating the mobile terminal position in close proximity to a base station (201 in FIG. 1).

Otherwise, the constraint of mathematical expression 2 is not fulfilled in the determining actions 300, 301, and 302, it is determined that the mobile terminal is not in close proximity to a base station (313) and the procedure proceeds to the action of calculating the mobile terminal position by a common formula using the principle of trilateration (111 in FIG. 1).

In the example shown in FIG. 2, because the mobile terminal is in close proximity to base station 2, $R_1-R_2$ is approximately equal to $D_{12}$ and $R_3-R_2$ is approximately equal to $D_{32}$. Therefore, the constraint of mathematical expression 2 is fulfilled in action 301 and it is determined in step 311 that the mobile terminal is in close proximity to base station 2, and the procedure proceeds to the step of calculating the mobile terminal position in close proximity to a base station (201 in FIG. 1). Examples of actual close proximity distances are dependent upon the application being sent to and from the mobile terminal. For weather forecasts, the range is about 3 km. For road traffic information, the range is about 300 m. For navigation, the range is about 10 m. However, the values described above might be adjusted also depending on the environment around the mobile terminal.

Even if it is determined that the mobile terminal is in close proximity to a base station, it can be determined whether the mobile terminal is also in close proximity to another base station by applying the constraint of mathematical expression 2 to other combinations of base stations. In consequence, if the constraint of mathematical expression 2 is fulfilled in a plurality of actions among the actions 300, 301, and 302 (it is determined that the mobile terminal is in close proximity to a plurality of base stations), the value of parameter B should be adjusted smaller so that the constraint of mathematical expression 2 is fulfilled in any one of the actions 300, 301, and 302 and a base station nearest to the mobile terminal can be identified.

If the value of parameter B is set greater, a base station nearest to the mobile terminal can be identified fast and the amount of arithmetic operation required for the action of determining if the mobile terminal is close to a base station can be reduced.

While the procedure of FIG. 3 assumes the scenario where the mobile terminal can receive radio channels from three base stations, even if the mobile terminal can receive radio channels from many base stations, it can be determined whether the mobile terminal is in close proximity to a base station in such a way that top three base stations in descending order of signal received power from the base stations are selected and the sub-actions within the action of determining if the mobile terminal is close to a base station, illustrated in FIG. 3, are executed for the combinations of the three base stations.

Next, another example of how the action of determining if the mobile terminal is close to a base station (200) makes such a determination will be described.

If the mobile terminal is in close proximity to a base station, it is reasonable that the quality of signal that the mobile terminal receives from the base station is better than the quality of signal that the mobile terminal receives from other base stations and the quality of the signal received from the base station is sufficiently good. As parameters indicating the received signal quality, Carrier to Interference Ratio (CIR), Signal to Interference Ratio (SIR), Signal to Noise Ratio (S/N), etc. can be used.

If the mobile terminal is in close proximity to one of the base stations that transmit radio signals to the mobile terminal, by comparing the amplitudes of received power of the signals from the base stations, for example, it is reasonable that the received power of the signal from the base station nearest to the mobile terminal is greater than the received power of the signals from other base stations and the received power of the signal from the base station is sufficiently great.

Taking advantage of this property of radio propagation, among N base stations (base station 1 to base station N), if a base station W which fulfills a constraint of mathematical expression 3 exists, it is determined that the mobile terminal is in close proximity to the base station W.

$$P_W = \text{Max}(P_1, P_2, \ldots P_N) \text{ and } P_W \geq P_{thrd} \quad \text{[Mathematical expression 3]}$$

In mathematical expression 3, Max ( ) represents a function outputting the maximum one of the values specified in the parentheses ( ). $P_{thrd}$ is a threshold as the criterion of determination. If the maximum value of power of the signals that the mobile terminal receive from the base stations is equal to or greater than $P_{thrd}$, it is determined that the mobile terminal is in close proximity of the base station transmitting the signal of the maximum received power. In this relation, a greater value should be assigned to $P_{thrd}$ if a rather wide range around a base station is regarded as the proximity range of the base station and a smaller value should be assigned to $P_{thrd}$ if a rather narrow range around a base station is regarded as the proximity range of the base station. Setting $P_{thrd}$ for practical applications is the same as described for parameter B with regard to mathematical expression 2. That is, in the case of applications such as weather forecasts and information on road traffic congestion which allow for a low accuracy of position measurement, the value of $P_{thrd}$ should be set equivalent to the required accuracy of position measurement (e.g., a few hundred meters). In the case of applications such as navigation which require a high accuracy of position measurement, the value of $P_{thrd}$ should be set equivalent to the required accuracy of position measurement (e.g., about ten meters).

Figure 4:
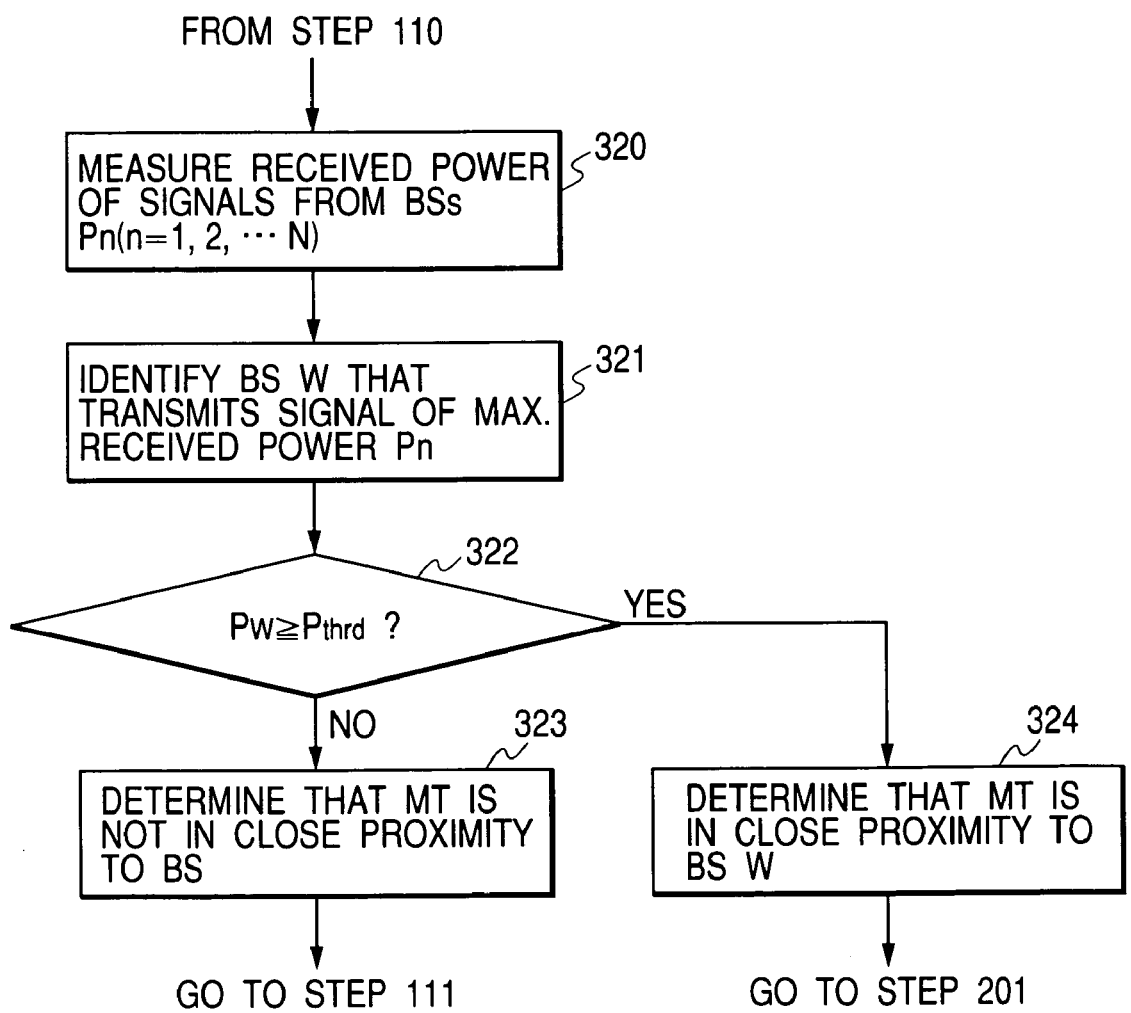
FIG. 4 is a flowchart of a second example of sub-actions taken within the determining if the mobile terminal is close to a base station, according to the preferred embodiment of the present invention.

FIG. 4 is a flowchart of a second example of sub-actions within the action of determining if the mobile terminal is close to a base station (200 in FIG. 1).

First, received power of the signals that the mobile terminal receive from the base stations $P_n$ (n=1, 2, ... N) is measured (320). The maximum received power $P_W$ is selected from among the received power measurements and the base station that transmits the signal of the maximum received power $P_W$ is identified (321).

The selected maximum received power $P_W$ is compared with the threshold $P_{thrd}$ and it is determined whether the mobile terminal is in close proximity to the base station, based on the result of the comparison (322). That is, it is determined whether the selected maximum received power $P_W$ is equal to or greater than the threshold $P_{thrd}$.

If $P_W$ is less than the threshold $P_{thrd}$ as the result of the determination, the received power of the signal from the base station W that transmits the signal of the maximum received power $P_W$ is not so great and, therefore, it is determined that the base station W is far from the mobile terminal (the mobile terminal is not in close proximity to the base station) (323) and the procedure proceeds to calculating the mobile terminal position by a common formula using the principle of trilateration (111 in FIG. 1). Otherwise, if $P_W$ is equal to or greater than the threshold $P_{thrd}$, the received power of the signal from the base station W that transmits the signal of the maximum received power $P_W$ is great and, therefore, it is determined that the mobile terminal is in close proximity to the base station W (324) and the procedure proceeds to the step of calculating the mobile terminal position in close proximity to a base station (201 in FIG. 1).

While, in the above-described embodiment, the received power of signals measured when the mobile terminal receives the signals transmitted from the base stations is used to determine if the mobile terminal is close to a base station, it may be possible to use the received power of signals measured when the base stations receive the signals transmitted from the mobile terminal, reversely.

Next, the action of calculating the mobile terminal position in close proximity to a base station (201 in FIG. 1) will be detailed below.

FIG. 5 is a flowchart of a first example of a sub-action within the action of calculating the mobile terminal position in close proximity to a base station.

When it is determined that the mobile terminal is in close proximity to the base station W in the action of determining if the mobile terminal is close to a base station (200 in FIG. 1), an action of equating the mobile terminal position with the position of the base station W is executed (400) and the procedure proceeds to the action of outputting the terminal position (112 in FIG. 1). That is, while calculating whether the mobile terminal position is in close proximity to a base station, illustrated in FIG. 5, it is determined that the mobile terminal and the base station are in the same position.

FIG. 6 is a flowchart of another example of sub-actions within the action of calculating the mobile terminal position in close proximity to a base station.

First, the equation (mathematical expression 1) for use in position calculation by trilateration is evaluated to obtain all real roots of coordinates (410). If the mobile terminal is in close proximity to the base station W, there are the coordinates of the real roots around the base station W.

Next, an action of evaluating an average of all real roots obtained in action 410 as the mobile terminal position is executed (411) and the procedure proceeds to the outputting the terminal position (112 in FIG. 1).

Figure 7:
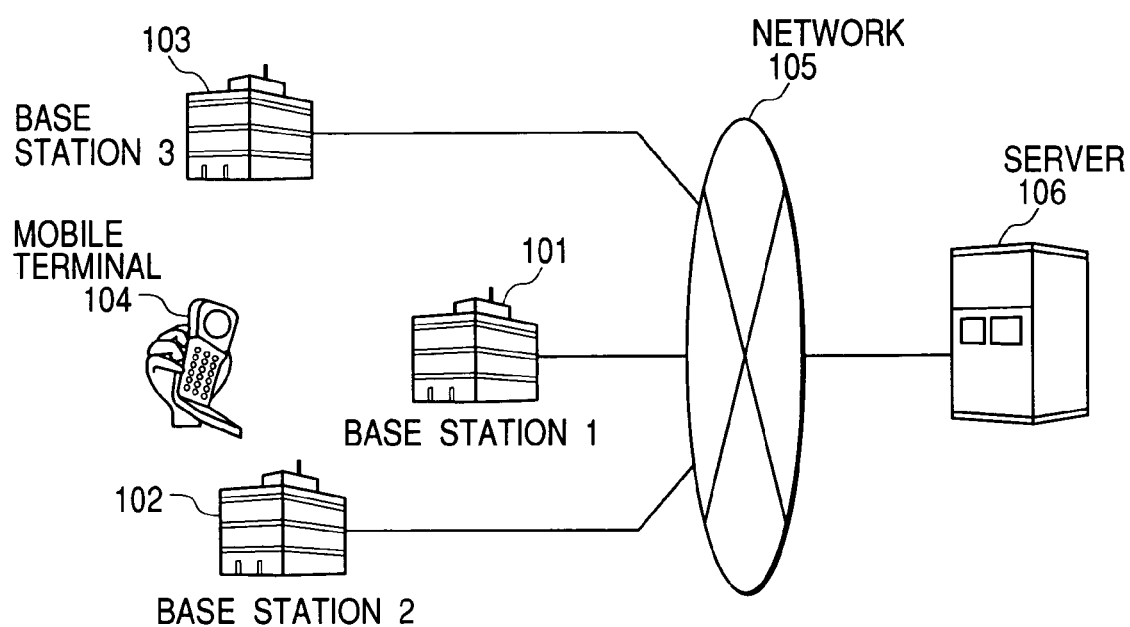
FIG. 7 shows a configuration example of a radio communications system where the position of a mobile terminal is measured, using the present invention.

FIG. 7 is another radio communications system configuration diagram, according to a preferred embodiment of the present invention.

A plurality of base stations (for example, three base stations 101, 102, and 103) are connected to a server 106 via a network 105 which may be formed as a public network, mobile communications network, or the like. A mobile terminal 104 sends and receives information to/from the server 106 via any of these base stations.

Measuring the position of a mobile terminal can be performed in two manners: one in which the mobile terminal receives signals transmitted from a plurality of base stations and the other in which a plurality of base station receive signals transmitted from the mobile terminal. In the following, examples of how the mobile terminal, server, and base station are configured and operate in each manner will be described.

Figure 8:
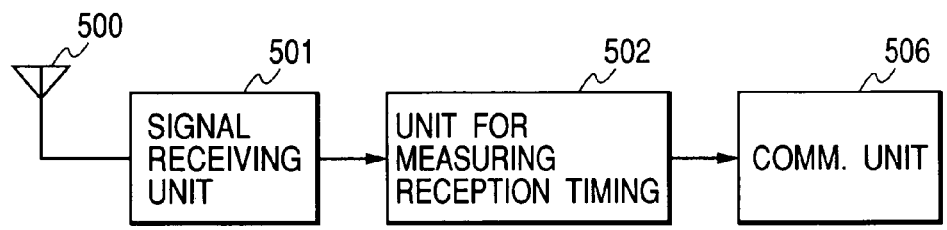
FIG. 8 is a block diagram showing a mobile terminal configuration of a first embodiment of the present invention.
Figure 9:
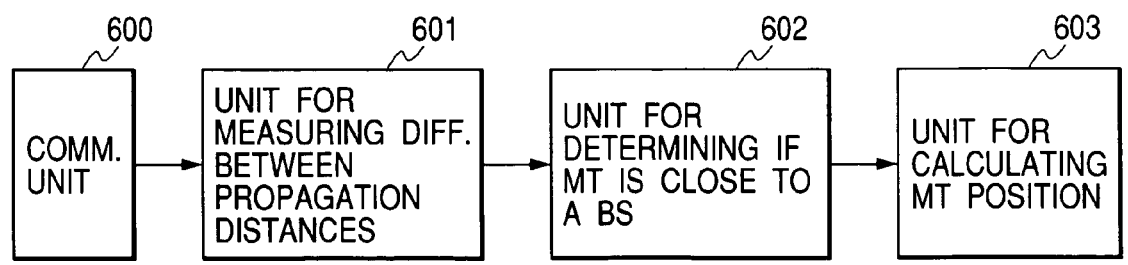
FIG. 9 is a block diagram showing a server configuration of the first embodiment of the present invention.

In the case of the manner in which the mobile terminal receive signals transmitted from a plurality of base stations, mobile terminal and server configurations of a first embodiment are shown in FIGS. 8 and 9, respectively.

FIG. 8 is a block diagram showing a mobile terminal configuration of the first embodiment.

An antenna 500 receives signals transmitted from the base stations.

A signal receiving unit 501 performs radio frequency and intermediate frequency receiving processing and signal processing such as A/D conversion for the signals received by the antenna 500. This unit may include analog circuits and devices such as amplifiers, filters and A/D converters.

A unit of measuring time to receive 502 measures the time at which the mobile terminal received the signals transmitted from the base stations for the signals received by the signal receiving unit 501. This unit may us a DSP or both a DSP and logic circuits such as FPGA, ASIC, or the like. For example, the unit of measuring time to receive is configured with matched filters and generates received signal profiles. This unit can be for example a Digital Signal Processor (DSP) or a DSP with a logic circuit such as an FPGA, ASIC or similar device.

A communication unit 506 transfers the received time stamps of the signals from the base stations measured by the unit of measuring time to receive 502 to the server 106 via any base station, according to a predetermined protocol such as, e.g., cellular communication. For example, the communication unit 506 may be a DSP processor or CPU or a communication interface chip.

FIG. 9 is a block diagram showing a server configuration of the first embodiment.

A communication unit 600 receives the received time stamps of the signals that the mobile terminal received from the base stations, which are transferred from the mobile terminal 104, according to the predetermined protocol.

A unit of measuring differences between propagation distances 601 executes the action of measuring differences between propagation differences (110 in FIG. 2), using the signals' received time stamps transferred from the mobile terminal.

A unit of determining if the mobile terminal is close to a base station 602 executes the action of determining if the mobile terminal is close to a base station (200 in FIG. 1), using the differences between propagation distances obtained by the unit of measuring differences between propagation distances 601. This may be for example, a processor or CPU.

A unit of calculating the mobile terminal position 603 executes either the action of calculating the mobile terminal position by a common formula using the principle of trilateration (111 in FIG. 1) or the action of calculating the mobile terminal position in close proximity to a base station (action 201 in FIG. 1), according to the result of the determination made by the unit of determining if the mobile terminal is close to a base station 602, and then executes the action of outputting the terminal position (112 in FIG. 1).

Figure 10:
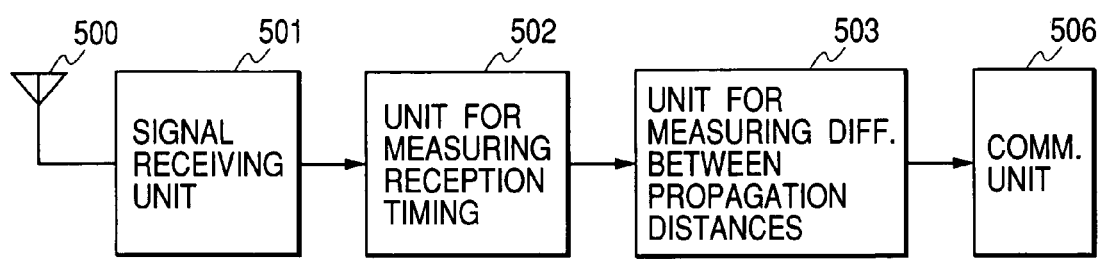
FIG. 10 is a block diagram showing a mobile terminal configuration of a second embodiment of the present invention.
Figure 11:
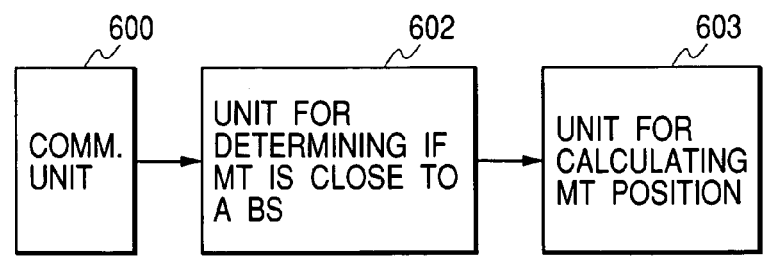
FIG. 11 is a block diagram showing a server configuration of the second embodiment of the present invention.

In the case of the manner in which the mobile terminal receive signals transmitted from a plurality of base stations, mobile terminal and server configurations of a second embodiment are shown in FIGS. 10 and 11, respectively. Components which function the same as the corresponding components of the foregoing mobile terminal and server of the first embodiment (FIGS. 8 and 9) are assigned the same reference numbers and their explanation is not repeated.

FIG. 10 is a block diagram showing a mobile terminal configuration of the second embodiment.

The antenna 500, signal receiving unit 501, and unit of measuring time to receive 502 operate the same as described for the foregoing mobile terminal of the first embodiment.

A unit of measuring differences between propagation distances 503 executes the action of measuring differences between propagation differences (110 in FIG. 2), using the received time stamps of the signals from the base stations measured by the unit of measuring time to receive 502.

The communication unit 506 transfers the differences between propagation distances obtained by the unit of measuring differences between propagation distances 503 to the server 106 shown in FIG. 7 via any base station, according to a predetermined protocol such as, e.g., cellular communication.

FIG. 11 is a block diagram showing a server configuration of the second embodiment.

The communication unit 600 receives the differences between propagation distances on the channels between the mobile terminal and the base stations, which are transferred from the mobile terminal 104, according to the predetermined protocol.

The unit of determining if the mobile terminal is close to a base station 602 executes the action of determining if the mobile terminal is close to a base station (200 in FIG. 1), using the differences between propagation distances transferred from the mobile terminal 104.

The unit of calculating the mobile terminal position 603 operates the same as described for the foregoing server of the first embodiment.

Figure 12:
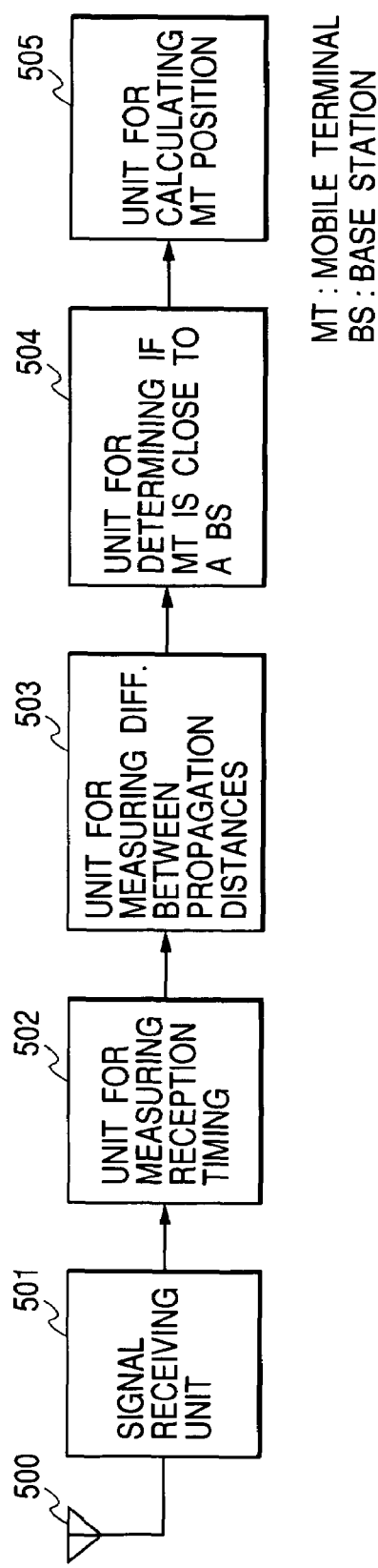
FIG. 12 is a block diagram showing a mobile terminal configuration of a third embodiment of the present invention.

FIG. 12 is a block diagram showing a mobile terminal configuration of a third embodiment in the case of the manner in which the mobile terminal receives signals transmitted from a plurality of base stations. Components which function the same as the corresponding components of the foregoing mobile terminals and servers of the first embodiment (FIGS. 8 and 9) and the second embodiment (FIGS. 10 and 11) are assigned the same reference numbers and their explanation is not repeated.

The antenna 500, signal receiving unit 501, unit of measuring time to receive 502, and unit of measuring differences between propagation distances 503 operate the same as described for the mobile terminals of the foregoing embodiments.

A unit of determining if the mobile terminal is close to a base station 504 executes the action of determining if the mobile terminal is close to a base station (200 in FIG. 1), using the differences between propagation distances obtained by the unit of measuring differences between propagation distances 503.

A unit of calculating the mobile terminal position 505 executes either the action of calculating the mobile terminal position by a common formula using the principle of trilateration (111 in FIG. 1) or the action of calculating the mobile terminal position in close proximity to a base station (201 in FIG. 1), according to the result of the determination made by the unit of determining if the mobile terminal is close to a base station 504, and then executes the action of outputting the terminal position (112 in FIG. 1).

Figure 14:
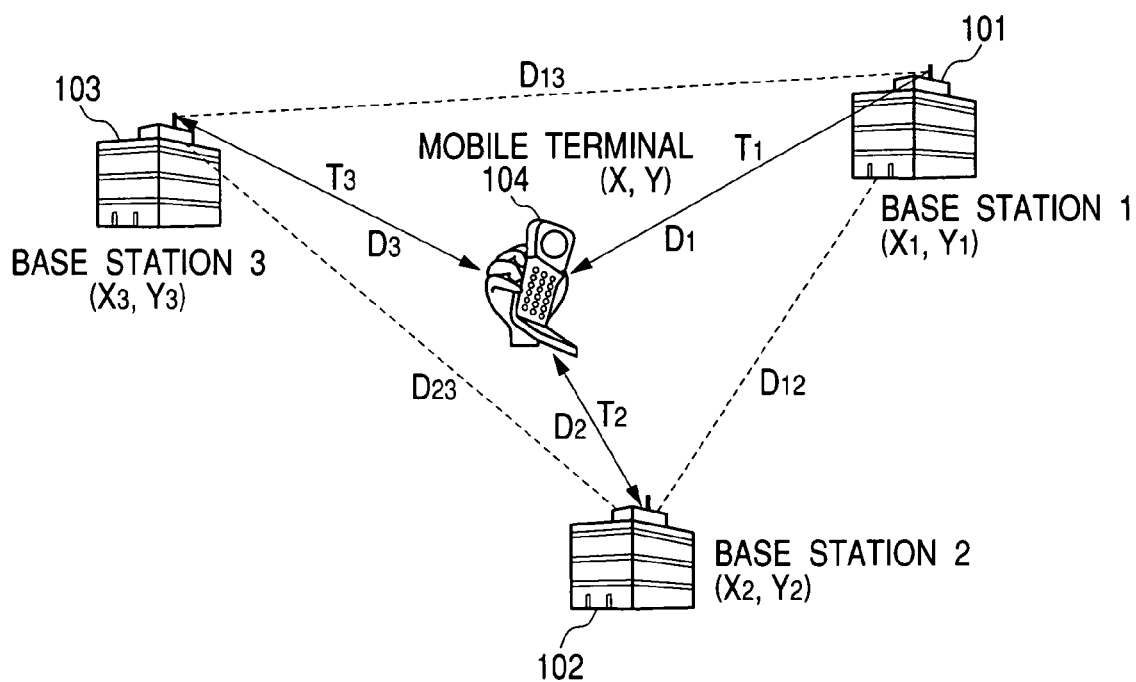
FIG. 14 is a diagram of a radio communication system configuration of prior art.

The present invention can be carried out in the manner in which a plurality of base stations receive a signal transmitted from a mobile terminal, for example, as disclosed in JP-B No. 260772/2002, a prior application made by the present applicant. In the case of this manner in which a plurality of base stations receive signals transmitted from the target mobile terminal, the method of measuring the present position of the mobile terminal will be described, using FIGS. 14 and 15.

In action 110, FIG. 15, in order to synchronize clocks that base stations individually have, a first base station transmits first signals and other base stations 101, 102, and 103 receive the first signals. At this time, each base station that received the first signal records the time at which it received the first signal.

Then, the mobile terminal 104 transmits second signals in order to measure its position. The base stations 101, 102, and 103 receive the second signals and each base station records the time at which it received the second signal. In action 110, moreover, from the received time stamps of the first signals at the base stations and the received time stamps of the second signals at the base stations, time differences of signal propagation on the channels from the base stations to the mobile terminal $T_3-T_1$ and $T_2-T_1$ are calculated. Finally, the thus calculated propagation time differences are multiplied by light velocity and, thereby, differences between the propagation distances of the signals from the base stations to the mobile terminal are calculated.

In action 111 and subsequent, the same operations are performed as in the above-described example of calculating the mobile terminal position, using cellular telephony signals.

Figure 13:
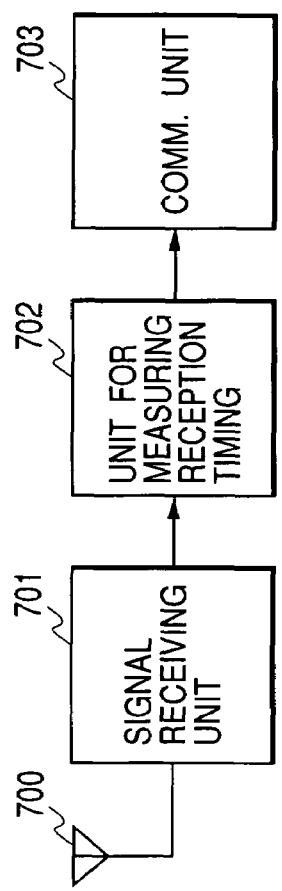
FIG. 13 is a block diagram showing a base station configuration of the third embodiment of the present invention.

FIG. 13 is a block diagram showing a base station configuration of a fourth embodiment in cases where the present invention is applied in the manner in which a plurality of base stations receive signals transmitted from the mobile terminal.

An antenna 700 receives signals transmitted from the mobile terminal.

A signal receiving unit 701 performs radio frequency and intermediate frequency receiving processing and signal processing such as A/D conversion for the signals received by the antenna 700.

A unit of measuring time to receive 702 measures the time at which the base station received the signal transmitted from the mobile terminal for the signals received by the signal receiving unit 701. For example, the unit of measuring time to receive can be configured with matched filters.

A communication unit 703 transfers the received time stamps of the signals from the mobile terminal measured by the unit of measuring time to receive 702 to the server 106, according to a network communication protocol. The server 106 configuration in this example is the same as the server of the first embodiment (FIG. 9) and the server 106 operates the same as, described for the foregoing server of first embodiment (FIG. 9), except that the communication unit 600 handles the received time stamp information transferred from the base station.

As described hereinbefore, in the preferred embodiment of the present invention, the method for calculating the position of the mobile terminal 104, using differences between propagation distances of radio signals being transmitted/received on the channels between the base stations 101, 102, and 103 and the mobile terminal 104, comprises the action of measuring differences between propagation distances 110 of the signals on the channels between the plurality of base stations and the mobile terminal, the action of determining if the mobile terminal is close to a base station 200, which determines whether the mobile terminal is in close proximity to any of the plurality of base stations, the action of calculating the position of the mobile terminal by a common formula 111 if it is determined that the mobile terminal is not in close proximity to any of the base stations, the action of calculating the position of the mobile terminal in close proximity to a base station 201 if it is determined that the mobile terminal is in close proximity to one of the base stations, and the action of outputting the position of the mobile terminal 112 calculated through the action of calculating the mobile terminal position in close proximity to a base station or the action of calculating the mobile terminal position by a common formula. Thus, even if the mobile terminal is in close proximity to a base station, the position of the mobile terminal can be-measured with accuracy and stability. Consequently, the area where the position information service can be offered would be extended and enhancing the convenience would be achievable.

Particularly, by using the action of determining if the mobile terminal is close to a base station 200 and the action of calculating the position of the mobile terminal in close proximity to a base station 201, it becomes feasible to provide the method of measuring the mobile terminal position with the amount of arithmetic operation appropriate for the accuracy of position measurement required by the position information service. More specifically, by tailoring the value of parameter B in the first example of sub-actions (FIG. 3) within the action of determining if the mobile terminal is close to a base station and the value of parameter $P_{thrd}$ in the second example of the above sub-actions (FIG. 4), according to the purpose of making use of the obtained position measurement of a mobile terminal, in the later position calculation stage, the action of calculating the mobile terminal position by a common formula using trilateration, which requires large amounts of arithmetic operation, can be avoided, and, instead, the position of the mobile terminal can be calculated by executing the sub-action of the first example (FIG. 5) within the action of calculating the mobile terminal position in close proximity to a base station, which needs only a small amount of arithmetic operation. Concretely, it is necessary to repeat arithmetic operations hundreds of thousand of times when the action of calculating the mobile terminal position by a common formula using trilateration is executed, whereas it is sufficient to repeat arithmetic operations several dozen times when the sub-action of the first example (FIG. 5) is executed as the action of calculating the mobile terminal position in close proximity to a base station. The amount of arithmetic operation can be reduced by a factor of about ten thousand.

Because the position of a mobile terminal is calculated with the amount of arithmetic operation being adjusted in accordance with the intended use, it becomes feasible to employ arithmetic units in accordance with the intended use and reduction in the cost of mobile terminals and the cost of the position information service can be realized.

Typical features and characteristics of the present invention other than those recited in the appended claims will be enumerated below.

Disclosed is an apparatus for measuring the position of a mobile terminal. Whether a the mobile terminal is close to a base station determines whether the difference between the propagation distance on the channel between one base station (out of the plurality of base stations) and the mobile terminal and the propagation distance on the channel between another base station (out of the plurality of base stations) and the mobile terminal, falls within a predetermined tolerance for the distance between said one base station and said another base station. For example, a tolerance corresponding to a required accuracy of positioning the mobile terminal for the distance between said one base station and said another base station; if all the plurality of base stations do not fulfill the above-described condition, the above apparatus determines that the mobile terminal is not in close proximity to any of the plurality of base stations; and if any of the plurality of base stations fulfills the above-described condition, the above apparatus determines that the mobile terminal is in close proximity to the base station that fulfills the above-described condition.

Further, the apparatus for measuring the position of a mobile terminal, may also determine if the mobile terminal is close to a base station measures the quality of signals that the mobile terminal received from the plurality of base stations, compares the received signal quality with a predetermined threshold, and determines whether the mobile terminal is in close proximity to any of the plurality of base stations, based on the result of the comparison.

An apparatus for measuring the position of a mobile terminal, wherein it is determined if the mobile terminal is close to a base station measures the quality of signals that the mobile terminal received from the plurality of base stations, identifies the maximum value of the measured received signal quality and the base station that transmits the signal of the maximum value, compares the maximum value of received signal quality thus identified with a predetermined threshold, and determines whether the mobile terminal is in close proximity to any of the plurality of base stations, based on the result of the comparison.

An apparatus for measuring the position of a mobile terminal, wherein it is determined if the mobile terminal is close to a base station measures the quality of signals that the plurality of base stations received from the mobile terminal, compares the received signal quality with a predetermined threshold, and determines whether the mobile terminal is in close proximity to any of the plurality of base stations, based on the result of the comparison.

An apparatus for measuring the position of a mobile terminal, wherein it is determined if the mobile terminal is close to a base station measures the quality of signals that the plurality of base stations received from the mobile terminal, identifies the maximum value of the measured received signal quality and the base station that receives the signal of the maximum value, compares the maximum value of received signal quality thus identified with a predetermined threshold, and determines whether the mobile terminal is in close proximity to any of the plurality of base stations, based on the result of the comparison.

An apparatus for measuring the position of a mobile terminal, wherein it is calculated whether the position of the mobile terminal in close proximity to a base station equates the position of the base station determined as being close to the mobile terminal with the position of the mobile terminal.

An apparatus for measuring the position of a mobile terminal, wherein it is calculated whether the position of the mobile terminal in close proximity to a base station gives a plurality of point candidates where the mobile terminal may be positioned through calculation with the differences between propagation distances obtained by measuring the differences between the propagation distances and averages the plurality of point candidates into a point as the position of the mobile terminal.

What is claimed is:

1. A method for determining the position of a mobile terminal, using differences between propagation distances of radio signals being transmitted and received between base stations and a mobile terminal, said method composing:
   measuring differences between propagation distances of radio signals between a plurality of base stations and a mobile terminal;
   determining if the mobile terminal is located in close proximity to a base station based on the measured differences;
   calculating the position of the mobile terminal by a trilateration formula if it is determined that said mobile terminal is not in close proximity to any of said base stations;
   calculating the position of the mobile terminal in close proximity to a base station without said trilateration formula if it is determined that said mobile terminal is in close proximity to one of said base stations; and
   outputting the position of the mobile terminal calculated.

2. The method for determining the position of a mobile terminal as in claim 1, wherein:
   said determining if the mobile terminal is in close proximity to a base station further comprises:
   determining whether a difference between the propagation distance between one base station out of said plurality of base stations, and the mobile terminal, and another propagation distance between another base station and the mobile terminal, falls within a predetermined tolerance for the distance between said one base station and said another base station whereby it is determined that said mobile terminal is in close proximity to the base station;

determining if the difference between the propagation distances with regard to all of said base stations does not fall within the predetermined tolerance for the distance between said base stations, whereby it is determined that said mobile terminal is not in close proximity to any of said base stations.

3. The method for determining the position of a mobile terminal as in claim 2, wherein said predetermined tolerance is corresponding to required accuracy of positioning the mobile terminal.

4. The method for determining the position of a mobile terminal as in claim 1, wherein:
   said determining if the mobile terminal is in close proximity to a base station further comprises:
   measuring the quality of signals that said mobile terminal receives from said plurality of base stations,
   comparing the received signal quality with a predetermined threshold, and
   determining whether said mobile terminal is in close proximity to any of said base stations, based on the result of the comparison.

5. The method for determining the position of a mobile terminal as in claim 1, wherein:
   said determining if the mobile terminal is in close proximity to a base station further comprises:
   measuring the quality of signals that said mobile terminal received from said plurality of base stations,
   identifying a maximum value of the measured received signal quality and the base station that transmits the signal of the maximum value,
   comparing the maximum value of the received signal quality thus identified with a predetermined threshold, and
   determining whether said mobile terminal is in close proximity to any of said base stations, based on the result of the comparison.

6. The method for determining the position of a mobile terminal as in claim 1, wherein said calculating the position of the mobile terminal in close proximity to a base station further comprises:
   equating the position of the base station determined as being in close proximity to said mobile terminal as the position of said mobile terminal.

7. The method for determining the position of a mobile terminal as in claim 1, wherein said calculating the position of the mobile terminal in close proximity to a base station further comprises:
   providing a plurality of point candidates where the mobile terminal is positioned through calculation with the differences between the propagation distances obtained by said measuring the differences between the propagation distances and
   averaging said plurality of point candidates into a point as the position of said mobile terminal.

8. A positioning system which measures reception timing of radio signals being transmitted and received between base stations and a mobile terminal and calculates the position of the mobile terminal, using differences between propagation distances of the radio signals, said positioning system comprising:
   a signal receiver receiving radio signals transmitted between a plurality of base stations and a mobile terminal; and
   a processor measuring the differences between propagation distances of the received radio signals;
   a determining unit determining if the mobile terminal is in close proximity to a base station based upon the measured differences;
   a calculating unit calculating the position of the mobile terminal by a trilateration formula if it is determined that said mobile terminal is not in close proximity to any of said base stations and calculating the position of the mobile terminal in close proximity to a base station without said trilateration formula if it is determined that said mobile terminal is in close proximity to one of said base stations; and
   an output unit outputting the position of the mobile terminal to an output terminal calculated by said trilateration formula or calculated without said trilateration formula to be in close proximity to a base station.

9. The positioning system as recited in claim 8, wherein:
   said determining unit, determining if the mobile terminal is in close proximity to a base station, also determines whether a difference between the propagation distance between one base station out of said plurality of base stations and the mobile terminal, and another propagation distance between another base station out of said plurality of base stations and the mobile terminal, falls within a predetermined tolerance for the distance between said one base station and said another base station;
   wherein if the difference between the propagation distances with regard to all said base stations does not fall within the predetermined tolerance for the distance between said base stations, said determining unit determines that said mobile terminal is not in close proximity to any of said base stations; and
   if the difference between the propagation distances with regard to any of said base stations falls within the predetermined tolerance for the distance between base stations, said determining unit determines that said mobile terminal is in close proximity to the base station.

10. The positioning system as recited in claim 8, wherein said predetermined tolerance corresponds to a required accuracy for positioning the mobile terminal.

11. The positioning system as recited in claim 8, wherein:
    said determining unit determining if the mobile terminal is in close proximity to a base station, also measures the quality of signals that said mobile terminal received from said plurality of base stations, and
    compares the received signal quality with a predetermined threshold, and
    determines whether said mobile terminal is in close proximity to any of said base stations, based on the result of the comparison.

12. The positioning system as recited in claim 8, wherein:
    said determining unit determining if the mobile terminal is in close proximity to a base station, also measures the quality of signals that said mobile station received from said plurality of base stations,
    identifies a maximum value of the measured received signal quality and the base station that transmits the signal of the maximum value,
    compares the maximum value of received signal quality thus identified with a predetermined threshold, and
    determines whether said mobile terminal is in close proximity to any of said base stations, based on the result of the comparison.

13. The positioning system as recited in claim 8, wherein:
said determining unit determining if the mobile terminal is in close proximity to a base station, also measures the quality of signals that said plurality of base stations received from said mobile terminal,
compares the received signal quality with a predetermined threshold, and
determines whether said mobile terminal is in close proximity to any of said base stations, based on the result of the comparison.

14. The positioning system as recited in claim 8, wherein:
said determining unit for determining if the mobile terminal is in close proximity to a base station, also measures the quality of signals that said plurality of base stations received from said mobile terminal,
identifies a maximum value of the measured received signal quality and the base station that receives the signal of the maximum value,
compares the maximum value of the received signal quality thus identified with a predetermined threshold, and determines whether said mobile terminal is in close proximity to any of said base stations based on the result of the comparison.

15. The positioning system as recited in claim 8 wherein said calculating unit for calculating the position of the mobile terminal in close proximity to a base station, equates the position of the base station determined as being close to said mobile terminal as the position of said mobile terminal.

16. The positioning system as recited in claim 8, wherein said calculating unit for calculating the position of the mobile terminal in close proximity to a base station,
provides a plurality of point candidates where the mobile terminal is positioned through calculation with the differences between propagation distances obtained by said processor for measuring the differences between the propagation distances and averages said plurality of point candidates into a point as the position of said mobile terminal.

17. A position calculation apparatus which receives radio signals being transmitted and received between base stations and a mobile terminal and calculates the position of the mobile terminal, using differences between propagation distances of the radio signals, said position calculation apparatus comprising:
a unit for measuring the differences between propagation distances of the signals between a plurality of base stations and a mobile terminal; p1 second unit for determining if the mobile terminal is close to a base station, which determines whether said mobile terminal is in close proximity to any of said base stations based on the measured differences;
a third unit for calculating the position of the mobile terminal by a trilateration formula if it is determined that said mobile terminal is not in close proximity to any of said base stations;
wherein said third unit also calculates the position of the mobile terminal in close proximity to a base station without said trilateration formula if it is determined that said mobile terminal is in close proximity to one of said base stations; and
an output terminal for outputting the position of the mobile terminal calculated without said trilateration formula by said third unit after calculating the mobile terminal position in close proximity to a base station, or for outputting the position of the mobile terminal calculated by said third unit after calculating the mobile terminal position by said trilateration formula.

* * * * *